(12) United States Patent
Roller et al.

(10) Patent No.: US 8,785,557 B2
(45) Date of Patent: Jul. 22, 2014

(54) USE OF AQUEOUS HYBRID BINDERS FOR GLOSS PAINTS

(75) Inventors: Sebastian Roller, Mannheim (DE); Roelof Balk, Boehl-Iggelheim (DE); Rolf Dersch, Neustadt (DE)

(73) Assignee: BASF SE, Ludwigshafen (DE)

( * ) Notice: Subject to any disclaimer, the term of this patent is extended or adjusted under 35 U.S.C. 154(b) by 437 days.

(21) Appl. No.: 12/966,528

(22) Filed: Dec. 13, 2010

(65) Prior Publication Data

US 2011/0144258 A1 Jun. 16, 2011

Related U.S. Application Data

(60) Provisional application No. 61/286,809, filed on Dec. 16, 2009.

(51) Int. Cl.
*C08K 5/103* (2006.01)
*C08G 63/49* (2006.01)
*C08G 63/48* (2006.01)

(52) U.S. Cl.
CPC ................ *C08K 5/103* (2013.01); *C08G 63/48* (2013.01)
USPC ......................................... 525/165; 525/167

(58) Field of Classification Search
CPC ...................................... C08K 5/103
USPC ............................... 525/165, 167
See application file for complete search history.

(56) References Cited

U.S. PATENT DOCUMENTS

| | | | |
|---|---|---|---|
| 4,226,007 | A | 10/1980 | Duenser |
| 4,269,749 | A | 5/1981 | Marriott et al. |
| 4,733,005 | A | 3/1988 | Schmidt et al. |
| 6,333,378 | B1 | 12/2001 | Clark et al. |
| 2008/0275165 | A1* | 11/2008 | Balk et al. ............ 523/501 |
| 2009/0004394 | A1* | 1/2009 | Koller et al. ............ 427/385.5 |

FOREIGN PATENT DOCUMENTS

| | | |
|---|---|---|
| DE | 2 061 213 | 6/1971 |
| DE | 2 207 209 | 10/1972 |
| DE | 27 22 097 A1 | 11/1978 |
| DE | 3132937 A1 | 3/1983 |
| DE | 10 2005 049 402 A1 | 4/2007 |
| DE | 10 2006 054 237 A1 | 5/2008 |
| EP | 0 874 875 A0 | 11/1998 |
| EP | 2 009 072 A1 | 12/2008 |
| WO | WO 93/25588 A1 | 12/1993 |
| WO | WO 97/26303 A1 | 7/1997 |
| WO | WO 99/25780 A1 | 5/1999 |
| WO | WO 2008/152078 A1 | 12/2008 |

OTHER PUBLICATIONS

K. C. Berger, et al., "Transfer Constants to Monomer, Polymer, Catalyst, Solvent, and Additive in Free Radical Polymerization", Polymer Handbook, 3, Auflage, John Wiley & Sons, 1989, pp. 81-151.
Houben-Weyl, Methoden der organischen Chemie, Band XIV/1, Makromolekulare Stoffe, Georg Thieme Verlag, 1961, pp. 411-420.
Houben-Weyl, Methoden der organischen Chemie, Band XIV/1, Makromolekulare Stoffe, Georg Thieme Verlag, 1961, pp. 192-208.
Ullmann's Encyclopedia of Industrial Chemistry, 5th Edition, vol. 21, (Editors Barbara Elvers, et al.), VHC Weinheim, 1992, pp. 167-171 (plus cover page).
Dr. Albrecht Zosel, "Methoden der Kunststoffphysik in der Lackprüfung", Farbe und Lack, 82, No. 2, 1976, pp. 125-134 (plus cover page).
Ullmanns Encyklopädie der technischen Chemie, 4. Auflage, Band 19, ("Polyacryl—Verbindungen bis Quecksilber"), Verlag Chemie, 1980, pp. 17-18 (with cover pages).
U.S. appl. No. 13/028,624, filed Feb. 16, 2011, Roller, et al.

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

The present invention relates to the use of aqueous hybrid binders for producing coating compositions, more particularly in high-gloss coating materials (high-gloss paints), and also to a process for their preparation with low residual monomer content.

12 Claims, No Drawings

USE OF AQUEOUS HYBRID BINDERS FOR GLOSS PAINTS

The present invention relates to the use of aqueous hybrid binders for producing coating compositions, more particularly in high-gloss coating materials (high-gloss paints), and also to a process for their preparation with low residual monomer content.

In accordance with their capacity to reflect light, coatings are typically divided into four categories (DIN EN 13300):
1. "gloss", with a reflectometer value of ≥60 at a measuring angle of 60°;
2. "medium gloss", with a reflectometer value of <60 at a measuring angle of 60° and ≥10 to 85;
3. "flat", with a reflectometer value of <10 at a measuring angle of 85°; and
4. "very flat", with a reflectometer value of <5 at a measuring angle of 85°.

The quality of unpigmented, and especially of pigmented, coating compositions based on aqueous polymer dispersions is critically dependent on the gloss of the coatings obtained. There has therefore been no lack of attempts to improve this feature by means of suitable additions. Often times, however, these additions have the disadvantage of also exhibiting a certain volatility, which impacts adversely on the fraction of volatile organic compounds (VOC) and the coatings obtained from such compositions.

EP 2 009 072 describes an aqueous polymer composition comprising acetoacetoxyethyl (meth)acrylate (AAEM) for decorative and protective coatings that comprises 8-35% of an autoxidizable material (e.g., an alkyd) as a result of cold blending or of addition during formulation.

EP 874 875 discloses a hybrid binder composition based on water and its use as a component in a paint or varnish mixture, the hybrid binder composition possessing a dry matter fraction of 60% to 95% by weight.

DE 313 2937 discloses a process for preparing water-thinnable resin preparations on the basis of alkyd resins and/or polyacrylates, where, in a first stage, the water-thinnable alkyd resin dispersion is prepared and subsequently, in a second stage of the process, the resultant alkyd resin dispersion is polymerized with acrylic and/or methacrylic acid derivatives.

U.S. Pat. No. 6,333,378 discloses water-based alkyd-acrylate hybrid systems which are prepared by polymerization of a previously sheared miniemulsion of an alkyd and of at least one acrylate monomer having a latently oxidative functionality.

WO 2008/152078 discloses low-VOC aqueous alkyd-acrylate hybrid binders which are prepared by a parallel feed process and so lead to binders having high residual acrylate monomer contents.

These compositions of the prior art have the disadvantage that they do not conform to the desired requirements in terms of gloss and/or surface smoothness, and have a high fraction of alkyds and also high residual monomer contents.

It was an object of the invention, therefore, to develop a process for preparing water-based alkyd-acrylate hybrid binders, and the use thereof for coating materials, more particularly for high-gloss paints and their formulation, these materials being notable for very high gloss and low gloss haze in conjunction with high hiding power and low residual monomer contents.

This object has been achieved in accordance with the invention by means of a process for preparing an aqueous polymer dispersion (PD) by free-radical emulsion polymerization of
(a) at least one α,β-ethylenically unsaturated monomer (M),
(b) and also, if desired, at least one further monomer (M1), to give a polymer (P),
(c) if desired, subsequent chemical deodorization and
(d) addition of at least one water-soluble alkyd resin having a weight-average molecular weight of between 5000 and 40 000 Da, or of at least one aqueous alkyd emulsion or polyurethane-alkyd emulsion,
which comprises adding the alkyd resin or the alkyd emulsion or polyurethane-alkyd emulsion either subsequent to the polymerization of M and M1, with an afterstir time of 0-2 h, or subsequent to the chemical deodorization, with an afterstir time of 0-2 h, the temperature at addition being 60 to 99° C., preferably 70 to 95° C., and more particularly 80 to 90° C.

The invention further provides coating compositions in the form of an aqueous composition comprising:
at least one dispersion as defined below,
if desired, at least one inorganic filler and/or inorganic pigment,
customary auxiliaries, and
water to 100% by weight.

The invention additionally provides a method of enhancing the gloss of a coating based on an aqueous polymer dispersion (PD), obtainable by free-radical emulsion polymerization of at least one α,β-ethylenically unsaturated monomer (M), by reaction with at least one water-soluble alkyd resin or aqueous alkyd emulsion or polyurethane-alkyd emulsion subsequent to the polymerization of M and M1 or subsequent to the chemical aftertreatment (deodorization) that follows the aqueous free-radical acrylate polymerization, as defined above.

The addition of the water-soluble alkyd resin or of the aqueous alkyd emulsion or polyurethane-alkyd resin emulsion to the polymer dispersion (PD) is made preferably after the emulsion polymerization for preparing the polymer (P). The addition of the water-soluble alkyd resin or of the aqueous alkyd emulsion or polyurethane-alkyd emulsion to the polymer dispersion (PD) may take place directly subsequent to the polymerization, i.e., directly after the end of the initiator feed. The addition preferably takes place after the end of the polymerization and of the afterstir time as defined above. With particular preference the addition is made after the chemical deodorization. With very particular preference the addition is made after the chemical deodorization, including the above-defined afterstir time. The afterstir time is 0 to 2 h, preferably less than 1 h, more preferably 30 min.

The invention further provides for the use of an aqueous polymer dispersion (PD) which comprises a water-soluble alkyd resin or an aqueous alkyd emulsion or polyurethane-alkyd emulsion, as defined above, as a component in transparent varnishes and in high-gloss paints.

The gloss of the coating material can be determined in accordance with DIN 67530. For that purpose the coating material is applied with a slot width of 240 μm to a glass plate and is dried at room temperature for 72 hours. The test specimen is inserted into a calibrated reflectometer, and, with a defined angle of incidence, a determination is made of the extent to which the light sent back has been reflected or scattered. The reflectometer value ascertained is a measure of the gloss (the higher the value, the higher the gloss).

The polymer dispersion (PD) used in accordance with the invention comprises preferably 5-60% by weight (solids), more preferably 10-50% by weight (solids), based on the total weight of the hybrid binder, of at least one water-soluble alkyd resin or aqueous alkyd emulsion or polyurethane-alkyd emulsion.

The inventive use of the water-soluble alkyd resins or of the aqueous alkyd emulsions or polyurethane-alkyd emulsions subsequent to the emulsion polymerization or subsequent to the chemical deodorization is accompanied by the following advantage:

increase in the gloss of coating compositions (coating materials), especially of gloss paints based on acrylate dispersions, with a simultaneously (in comparison to other hybridization methods) reduced amount of residual acrylate monomers.

In the context of the present invention the expression "alkyl" comprises straight-chain and branched alkyl groups. Suitable short-chain alkyl groups are, for example, straight-chain or branched $C_1$-$C_7$ alkyl, preferably $C_1$-$C_6$ alkyl, and more preferably $C_1$-$C_4$ alkyl groups. They include more particularly methyl, ethyl, propyl, isopropyl, n-butyl, 2-butyl, sec-butyl, tert-butyl, n-pentyl, 2-pentyl, 2-methylbutyl, 3-methylbutyl, 1,2-dimethyl-propyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, etc.

Suitable longer-chain $C_8$-$C_{30}$ alkyl groups are straight-chain or branched alkyl groups. They are preferably predominantly linear alkyl radicals, of the kind also occurring in natural or synthetic fatty acids and fatty alcohols and also oxo-process alcohols. They include, for example, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, etc. The expression "alkyl" comprises unsubstituted and substituted alkyl radicals.

The above remarks for alkyl also apply to the alkyl moieties in arylalkyl. Preferred arylalkyl radicals are benzyl and phenylethyl.

$C_8$-$C_{32}$ alkenyl in the context of the present invention stands for straight-chain and branched alkenyl groups, which may be singly, doubly or multiply unsaturated. Preference is given to $C_{10}$-$C_{20}$ alkenyl. The expression "alkenyl" comprises unsubstituted and substituted alkenyl radicals. The radicals in question are, especially, predominantly linear alkenyl radicals, of the kind which also occur in natural or synthetic fatty acids and fatty alcohols and also oxo-process alcohols. They include more particularly octenyl, nonenyl, decenyl, undecenyl, dodecenyl, tridecenyl, tetradecenyl, pentadecenyl, hexadecenyl, heptadecenyl, octadecenyl, nonadecenyl, linolyl, linolenyl, eleostearyl, and oleyl (9-octadecenyl).

The expression "alkylene" in the sense of the present invention stands for straight-chain or branched alkanediyl groups having 1 to 7 carbon atoms, such as methylene, 1,2-ethylene, 1,3-propylene, etc.

Cycloalkyl stands preferably for $C_4$-$C_8$ cycloalkyl, such as cyclobutyl, cyclopentyl, cyclohexyl, cycloheptyl or cyclooctyl.

The expression "aryl" comprises for the purposes of the present invention monocyclic or polycyclic aromatic hydrocarbon radicals which may be unsubstituted or substituted. The expression "aryl" stands preferably for phenyl, tolyl, xylyl, mesityl, duryl, fluorenyl, anthracenyl, phenanthrenyl or naphthyl, more preferably for phenyl or naphthyl, it being possible to carry for these aryl groups, in the case of substitution, to carry generally 1, 2, 3, 4 or 5, preferably 1, 2 or 3, substituents.

The polymer dispersion (PD) is prepared using at least one α,β-ethylenically unsaturated monomer (M), which is preferably selected from esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, monoethylenically unsaturated carboxylic and sulfonic acids, phosphorus monomers, esters of α,β-ethylenically unsaturated monocarboxylic and dicarboxylic acids with $C_2$-$C_{30}$ alkanediols, amides of α,β-ethylenically unsaturated monocarboxylic and dicarboxylic acids with $C_2$-$C_{30}$ amino alcohols which contain a primary or secondary amino group, primary amides of α,β-ethylenically unsaturated monocarboxylic acids and their N-alkyl and N,N-dialkyl derivatives, N-vinyllactams, open-chain N-vinylamide compounds, esters of allyl alcohol with $C_1$-$C_{30}$ monocarboxylic acids, esters of α,β-ethylenically unsaturated monocarboxylic and dicarboxylic acids with amino alcohols, amides of α,β-ethylenically unsaturated monocarboxylic and dicarboxylic acids with diamines which contain at least one primary or secondary amino group, N,N-diallylamines, N,N-diallyl-N-alkylamines, vinyl- and allyl-substituted nitrogen heterocycles, vinyl ethers, $C_2$-$C_8$ monoolefins, nonaromatic hydrocarbons having at least two conjugated double bonds, polyether (meth)acrylates, monomers containing urea groups, and mixtures thereof.

Suitable esters of α,β-ethylenically unsaturated monocarboxylic and dicarboxylic acids with $C_1$-$C_{20}$ alkanols are methyl (meth)acrylate, methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachinyl (meth)acrylate, behenyl (meth)acrylate, lignoceryl (meth)acrylate, cerotinyl (meth)acrylate, melissinyl (meth)acrylate, palmitoleyl (meth)acrylate, oleyl (meth)acrylate, linolyl (meth)acrylate, linolenyl (meth)acrylate, stearyl (meth)acrylate, lauryl (meth)acrylate, and mixtures thereof.

Preferred vinylaromatics are styrene, 2-methylstyrene, 4-methylstyrene, 2-(n-butyl)styrene, 4-(n-butyl)styrene, 4-(n-decyl)styrene, and, with particular preference, styrene.

Suitable esters of vinyl alcohol with $C_1$-$C_{30}$ monocarboxylic acids are, for example, vinyl formate, vinyl acetate, vinyl propionate, vinyl butyrate, vinyl laurate, vinyl stearate, vinyl propionate, Versatic acid vinyl esters, and mixtures thereof.

Suitable ethylenically unsaturated nitriles are acrylonitrile, methacrylonitrile, and mixtures thereof.

Suitable vinyl halides and vinylidene halides are vinyl chloride, vinylidene chloride, vinyl fluoride, vinylidene fluoride, and mixtures thereof.

Suitable ethylenically unsaturated carboxylic acids and sulfonic acids or their derivatives are acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, the monoesters of monoethylenically unsaturated dicarboxylic acids having 4 to 10, preferably 4 to 6, C atoms, e.g., monomethyl maleate, vinylsulfonic acid, allylsulfonic acid, sulfoethyl acrylate, sulfoethyl methacrylate, sulfopropyl acrylate, sulfopropyl methacrylate, 2-hydroxy-3-acryloyloxy-propylsulfonic acid, 2-hydroxy-3-methacryloyloxypropylsulfonic acid, styrenesulfonic acids, and 2-acrylamido-2-methylpropanesulfonic acid. Suitable styrenesulfonic acids and derivatives thereof are styrene-4-sulfonic acid and styrene-3-sulfonic acid and the alkali metal or alkaline earth metal salts thereof, such as sodium styrene-3-sulfonate and sodium styrene-4-sulfonate, for example. Particularly preferred are acrylic acid, methacrylic acid, and mixtures thereof.

Examples of phosphorus monomers are vinylphosphonic acid and allylphosphonic acid, for example. Also suitable are the monoesters and diesters of phosphonic acid and phosphoric acid with a hydroxyalkyl (meth)acrylates, especially the monoesters. Additionally suitable are diesters of phosphonic acid and phosphoric acid that have been esterified once with hydroxyalkyl (meth)acrylate and also once with a different alcohol, such as an alkanol, for example. Suitable hydroxyalkyl (meth)acrylates for these esters are those specified below as separate monomers, more particularly 2-hydroxyethyl (meth)acrylate, 3-hydroxypropyl (meth)acrylate, 4-hydroxybutyl (meth)acrylate, etc. Corresponding dihydrogen phosphate ester monomers comprise phosphoalkyl (meth)acrylates, such as 2-phosphoethyl (meth)acrylate, 2-phosphopropyl (meth)acrylate, 3-phosphopropyl (meth)acrylate, phosphobutyl (meth)acrylate, and 3-phospho-2-hydroxypropyl (meth)acrylate. Also suitable are the esters of phosphonic acid and phosphoric acid with alkoxylated hydroxyalkyl (meth)acrylates, examples being the ethylene oxide condensates of (meth)acrylates, such as $H_2C=C(CH_3)COO(CH_2CH_2O)_nP(OH)_2$ and $H_2C=C(CH_3)COO(CH_2CH_2O)_nP(=O)(OH)_2$, in which n is 1 to 50. Of further suitability are phosphoalkyl crotonates, phosphoalkyl maleates, phosphoalkyl fumarates, phosphodialkyl (meth)acrylates, phosphodialkyl crotonates and allyl phosphates. Further suitable monomers containing phosphorus groups are described in WO 99/25780 and U.S. Pat. No. 4,733,005, hereby incorporated by reference.

Suitable esters of α,β-ethylenically unsaturated monocarboxylic and dicarboxylic acids with $C_2$-$C_{30}$ alkanediols are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, etc.

Suitable primary amides of α,β-ethylenically unsaturated monocarboxylic acids and their N-alkyl and N,N-dialkyl derivatives are acrylamide, methacrylamide, N-methyl(meth)acrylamide, N-ethyl(meth)acrylamide, N-propyl(meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth)acrylamide, N-arachidyl(meth)acrylamide, N-behenyl(meth)acrylamide, N-lignoceryl(meth)acrylamide, N-cerotinyl(meth)acrylamide, N-melissinyl(meth)acrylamide, N-palmitoleyl(meth)acrylamide, N-oleyl(meth)acrylamide, N-linolyl(meth)acrylamide, N-linolenyl(meth)acrylamide, N-stearyl(meth)acrylamide, N-lauryl(meth)acrylamide, N,N-dimethyl(meth)acrylamide, N,N-diethyl(meth)acrylamide, morpholinyl(meth)acrylamide.

Suitable N-vinyllactams and their derivatives are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam, etc.

Suitable open-chain N-vinylamide compounds are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide, and N-vinylbutyramide.

Suitable esters of α,β-ethylenically unsaturated monocarboxylic and dicarboxylic acids with amino alcohols are N,N-dimethylaminomethyl (meth)acrylate, N,N-dimethylaminoethyl (meth)acrylate, N,N-diethylaminoethyl acrylate, N,N-dimethylaminopropyl (meth)acrylate, N,N-diethylaminopropyl (meth)acrylate, and N,N-dimethylaminocyclohexyl (meth)acrylate.

Suitable amides of α,β-ethylenically unsaturated monocarboxylic and dicarboxylic acids with diamines which contain at least one primary or secondary amino group are N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl]acrylamide, N-[4-(dimethylamino)cyclohexyl]acrylamide, N-[4-(dimethylamino)cyclohexyl]methacrylamide, etc.

Suitable monomers (M) are, furthermore, N,N-diallylamines and N,N-diallyl-N-alkylamines and their acid addition salts and quaternization products. Alkyl here is preferably $C_1$-$C_{24}$ alkyl. Preference is given to N,N-diallyl-N-methylamine and to N,N-diallyl-N,N-dimethylammonium compounds, such as the chlorides and bromides, for example.

Further suitable monomers (M) are vinyl- and allyl-substituted nitrogen heterocycles, such as N-vinylimidazole, N-vinyl-2-methylimidazole, and vinyl- and allyl-substituted heteroaromatic compounds, such as 2- and 4-vinylpyridine, 2- and 4-allylpyridine, and the salts thereof.

Suitable $C_2$-$C_8$ monoolefins and nonaromatic hydrocarbons having at least two conjugated double bonds are for example ethylene, propylene, isobutylene, isoprene, butadiene, etc.

Examples of suitable monomers containing urea groups are N-vinylurea or N-allylurea or derivatives of imidazolidin-2-one. They include N-vinyl- and N-allylimidazolidin-2-one, N-vinyloxyethylimidazolidin-2-one, N-(2-(meth)acrylamidoethyl)imidazolidin-2-one, N-(2-(meth)acryloxyethyl)imidazolidin-2-one (i.e., 2-ureido (meth)acrylate), N-[2-((meth)acryloxyacetamido)ethyl]imidazolidin-2-one, etc.

Preferred monomers containing urea groups are N-(2-acryloxyethyl)imidazolidin-2-one and N-(2-methacryloxyethyl)imidazolidin-2-one. Particular preference is given to N-(2-methacryloxyethyl)imidazolidin-2-one (2-ureido methacrylate, UMA).

The aforementioned monomers (M) may be used individually, in the form of mixtures within one class of monomer, or in the form of mixtures from different classes of monomer.

For the emulsion polymerization it is preferred to use at least 40%, more preferably at least 60%, and more particularly at least 80% by weight, based on the total weight of the monomers M), of at least one monomer M1) selected from esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, and mixtures thereof (principal monomers). Preferably the monomers M1) are used for the emulsion polymerization in an amount of up to 95% by weight, based on the total weight of the monomers M).

The principal monomers M1) are preferably selected from methyl (meth)acrylate, ethyl (meth)acrylate, n-propyl (meth)acrylate, isopropyl (meth)acrylate, n-butyl (meth)acrylate, sec-butyl (meth)acrylate, tert-butyl (meth)acrylate, n-pentyl (meth)acrylate, n-hexyl (meth)acrylate, n-heptyl (meth)acrylate, n-octyl (meth)acrylate, 2-ethylhexyl (meth)acrylate, isobornyl (meth)acrylate, styrene, 2-methylstyrene, vinyl acetate, acrylonitrile, methacrylonitrile, and mixtures thereof.

In addition to at least one principal monomer M1) it is also possible in the free-radical emulsion polymerization for the preparation of (PD) to use at least one further monomer M2), which is generally present in a minority amount (secondary monomers). For the emulsion polymerization it is preferred to use up to 60%, more preferably up to 40%, and more particularly up to 20% by weight, based on the total weight of the monomers M), of at least one monomer M2) selected from ethylenically unsaturated monocarboxylic and dicarboxylic acids and the anhydrides and monoesters of ethylenically unsaturated dicarboxylic acids, (meth)acrylamides, $C_1$-$C_{10}$ hydroxyalkyl (meth)acrylates, $C_1$-$C_{10}$ hydroxyalkyl(meth)acrylamides, and mixtures thereof. Preferably the monomers M2), when present, are used for the emulsion polymerization in an amount of at least 0.1% by weight, more preferably at least 0.5% by weight, more particularly at least 1% by weight, based on the total weight of the monomers M).

For the emulsion polymerization it is particularly preferred to use 0.1% up to 60%, preferably 0.5% to 40%, more particularly 1% to 20% by weight of at least one monomer M2). The monomers M2) are especially selected from acrylic acid, methacrylic acid, itaconic acid, maleic acid, fumaric acid, maleic anhydride, acrylamide, methacrylamide, 2-hydroxyethyl acrylate, 2-hydroxyethyl methacrylate, 2-hydroxyethylacrylamide, 2-hydroxyethylmethacrylamide, acetoacetoxyethyl methacrylate (AAEM), allyl methacrylate, vinyl methacrylate, hydroxybutenyl methacrylate, allyl or diallyl esters of maleic acid, poly(allyl glycidyl ether), and mixtures thereof, in the form of various products bearing the name Bisomer® from Laporte Performance Chemicals, UK. These include, for example, Bisomer® MPEG 350 MA, a methoxypolyethylene glycol monomethacrylate, or UMA. More particular preference is given to using AAEM in amounts of 0.1% to 20%, preferably of 0.1% to 4.9% by weight. Particularly suitable combinations of principal monomers M1) for the process of the invention are, for example:
n-butyl acrylate, methyl methacrylate;
n-butyl acrylate, methyl methacrylate, styrene;
n-butyl acrylate, styrene, butyl (meth)acrylate;
n-butyl acrylate, ethylhexyl acrylate, styrene;
n-butyl acrylate, styrene; or
n-butyl acrylate, n-butyl (meth)acrylate, methyl methacrylate.

The aforementioned particularly suitable combinations of principal monomers M1) can be combined with particularly suitable monomers (M2), which are preferably selected from acrylic acid, methacrylic acid, acrylamide, methacrylamide, AAEM, UMA or Bisomer®, and mixtures thereof.

An alkyd resin is understood to be a polyester which is esterified with a drying oil, a fatty acid or the like (U. Poth, Polyester and Alkydharze, Vincentz Network 2005).

An aqueous alkyd resin is understood more particularly to be an alkyd resin solution which can be diluted with water—possibly after neutralization—and which is based on an alkyd resin having a sufficiently high acid number of preferably 20-80 mg KOH/g alkyd resin solids, and having a weight-average molecular weight of >5000 and <40 000 Da, preferably >8000 and <35 000 Da, and more preferably >10 000 and <35 000 Da.

The molecular weights are determined by size exclusion chromatography (SEC).

By acid number is meant the amount of potassium hydroxide, expressed in mg, which is needed in order to neutralize 1 g of the sample.

The oil used, or the fatty acid, is the property-determining component. It allows subdivision according to the fatty acid triacylglycerol content (oil content, oil length), into short-oil alkyd resins with <40%, medium-oil alkyd resins with 40-60%, and long-oil alkyd resins with >60% triacylglycerol, based on solvent-free alkyd resin (converting fatty acid content to triacylglycerol if necessary, factor approximately 1.045) (oil content).

In accordance with general practice, the solids content characterizes the "active ingredient content" of the dispersion. The dispersion is typically dried to constant weight at a temperature between 100 and 140° C. (see ISO standard 1625). The solids content indicates the dry mass in comparison to the total mass (in %).

The dry mass comprises the polymer, emulsifiers, and inorganic salts (from initiator decomposition and neutralization). The volatile constituents include the water and those monomers which have not reacted during the polymerization.

The oil content of the alkyd resins used is 25-55%, the solids content is 30-80% in the supply form and 35-50% in the use form (following dilution with $NH_3$ and/or NaOH/water).

Examples of preferred alkyd resins are the products WorléeSol® 61A, WorléeSol® 61E, WorléeSol® 65A from Worlée, and Synthalat® W46 or Synthalat® W48, from Synthopol.

An aqueous alkyd resin emulsion, or alkyd emulsion for short, is understood to refer to alkyd resins which, possibly with addition of emulsifiers, are dispersed in water. In comparison to water-soluble or dilutable alkyd resins, suitability for this purpose is also possessed by alkyds having relatively high average molar masses [U. Poth, Polyester und Alkydharze, Vincentz Network 2005, p. 183 f.].

An aqueous polyurethane-alkyd resin emulsion is understood to be a polyurethane-modified alkyd resin which has been dispersed in water. Urethane modification may take place in the course of alkyd synthesis, for example, by the replacement of some of the customary phthalic anhydride by a diisocyanate [U. Poth, Polyester und Alkydharze, Vincentz Network 2005, p. 205 f.]. Urethane modification may additionally be accomplished by reaction of an alkyd with an at least difunctional polyisocyanate [DE 102006054237, Bayer MaterialScience AG].

Preferred alkyd resin emulsions feature an oil content of 25-55% and an acid number of 20-60 mg KOH/g.

Preferred alkyd resin emulsions and polyurethane-modified alkyd resin emulsions are WorléeSol® E 150 W, WorléeSol® E 280 W, WorléeSol® E 530 W or WorléeSol® E 927 W.

For preparing the polymer dispersion (PD) it is preferred to use aqueous alkyd emulsions or polyurethane-alkyd emulsions.

In the preparation of the polymer dispersions of the invention it is possible to use at least one crosslinker in addition to the aforementioned monomers (M). Monomers which possess a crosslinking function are compounds having at least two polymerizable, ethylenically unsaturated, nonconjugated double bonds in the molecule. Crosslinking may also take place, for example, through photochemical activation. For that purpose it is possible to prepare (PD) additionally using at least one monomer containing photoactivable groups. Photoinitiators can also be added separately. Crosslinking can also be accomplished, for example, by means of functional groups which are able to enter into a chemical crosslinking reaction with complementary functional groups. In that case the complementary groups may both be attached to the emulsion polymer or for the crosslinking it is possible to use a crosslinker which is capable of being able to enter into a chemical crosslinking reaction with functional groups of the emulsion polymer.

Suitable crosslinkers are, for example, acrylic esters, methacrylic esters, allyl ethers or vinyl ethers of at least dihydric alcohols. The OH groups of the parent alcohols may be wholly or partly etherified or esterified; the crosslinkers, however, comprise at least two ethylenically unsaturated groups.

Examples of the parent alcohols are dihydric alcohols such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis (hydroxymethyl)cyclohexane, hydroxypivalic acid neopentyl glycol monoester, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiapentane-1,5-diol, and also polyethylene glycols, polypropylene glycols, and polytetrahydrofurans having molecular weights of in each case 200 to 10 000. Besides the homopolymers of ethylene oxide or propylene oxide it is also possible to use block copolymers of ethylene oxide or propylene oxide, or copolymers which incorporate ethylene oxide and propylene oxide groups. Examples of parent alcohols having more than two OH groups are trimethylolpropane, glycerol, pentaerythritol, 1,2,5-pentanetriol, 1,2,6-hexanetriol, cyanuric acid, sorbitan, sugars such as sucrose, glucose, and mannose. The polyhydric alcohols can of course also be used, following reaction with ethylene oxide or propylene oxide, in the form of the corresponding ethoxylates or propoxylates. The polyhydric alcohols can also first be converted to the corresponding glycidyl ethers by reaction with epichlorohydrin.

Additional suitable crosslinkers are the vinyl esters or the esters of monohydric, unsaturated alcohols with ethylenically unsaturated $C_3$-$C_6$ carboxylic acids, examples being acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. An alternative option is to esterify the monohydric, unsaturated alcohols with polybasic carboxylic acids, examples being malonic acid, tartaric acid, trimellitic acid, phthalic acid, terephthalic acid, citric acid or succinic acid.

Other suitable crosslinkers are esters of unsaturated carboxylic acids with the above-described polyhydric alcohols, examples being those of oleic acid, crotonic acid, cinnamic acid or 10-undecenoic acid.

Suitable crosslinkers, furthermore, are straight-chain or branched, linear or cyclic, aliphatic or aromatic hydrocarbons which possess at least two double bonds, which in the case of aliphatic hydrocarbons must not be conjugated, examples being divinylbenzene, divinyltoluene, 1,7-octadiene, 1,9-decadiene, 4-vinyl-1-cyclohexene, trivinylcyclohexane or polybutadienes having molecular weights of 200 to 20 000.

Further suitable crosslinkers are the acrylamides, methacrylamides, and N-allylamines of at least difunctional amines. Such amines are, for example, 1,2-diaminoethane, 1,3-diaminopropane, 1,4-diaminobutane, 1,6-diaminohexane, 1,12-dodecanediamine, piperazine, diethylenetriamine or isophoronediamine. Likewise suitable are the amides formed from allylamine and unsaturated carboxylic acids, such as acrylic acid, methacrylic acid, itaconic acid, maleic acid, or at least dibasic carboxylic acids, of the kind described above.

Furthermore, triallylamine and triallylmonoalkylammonium salts, e.g., triallylmethylammonium chloride or triallylmethylammonium methylsulfate, are suitable as crosslinkers.

Also suitable are N-vinyl compounds of urea derivatives, at least difunctional amides, cyanurates or urethanes, such as of urea, ethyleneurea, propyleneurea or tartaramide, for example, such as N,N'-divinylethyleneurea or N,N'-divinylpropyleneurea.

Further suitable crosslinkers are divinyldioxane, tetraallylsilane or tetravinylsilane. It will be appreciated that mixtures of the aforementioned compounds can also be used. Preference is given to using water-soluble crosslinkers.

Further included among the crosslinking monomers are those which as well as an ethylenically unsaturated double bond contain a reactive functional group, such as an aldehyde group, a keto group or an oxirane group, able to react with an added crosslinker. The functional groups are preferably keto groups or aldehyde groups. The keto or aldehyde groups are preferably attached to the polymer through copolymerization of copolymerizable, ethylenically unsaturated compounds with keto or aldehyde groups. Suitable such compounds are acrolein, methacrolein, vinyl alkyl ketones having 1 to 20, preferably 1 to 10, carbon atoms in the alkyl radical, formylstyrene, (meth)acrylic acid alkyl esters having one or two keto or aldehyde groups or one aldehyde group and one keto group in the alkyl radical, the alkyl radical preferably comprising a total of 3 to 10 carbon atoms, examples being (meth)acryloxyalkylpropanals, as described in DE-A-2722097. Also suitable, furthermore, are N-oxoalkyl(meth)acrylamides of the kind known, for example, from U.S. Pat. No. 4,226,007, DE-A-2061213 or DE-A-2207209. Particularly preferred are acetoacetyl (meth)acrylate, acetoacetoxyethyl (meth)acrylate and, more particularly, diacetoneacrylamide. The crosslinkers are preferably a compound with at least 2 functional groups, more particularly 2 to 5 functional groups, which are able to enter into a crosslinking reaction with the functional groups of the polymer, especially the keto or aldehyde groups. Functional groups for the crosslinking of the keto or aldehyde groups include, for example, hydrazide, hydroxylamine or oxime ether or amino groups. Suitable compounds of hydrazide groups are, for example, polycarboxylic hydrazides having a molar weight of up to 500 g/mol. Particularly preferred hydrazide compounds are dicarboxylic dihydrazides having preferably 2 to 10 C atoms. Examples of such include oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/or isophthalic dihydrazide. Of particular interest are the following: adipic dihydrazide, sebacic dihydrazide, and isophthalic dihydrazide. Suitable compounds with hydroxylamine or oxime ether groups are specified for example in WO 93/25588.

By appropriate additization of the aqueous polymer dispersion (PD) it is also possible additionally to produce surface crosslinking. Such additization includes, for example, the addition of a photoinitiator, or of siccatives. Suitable photoinitiators are those which are excited by sunlight, examples being benzophenone or derivatives thereof. Suitable siccatives are the metal compounds recommended for aqueous alkyd resins, based for example on Co or Mn (overview in U. Poth, Polyester and Alkydharze, Vincentz Network 2005, p. 183 f).

The crosslinking component is used preferably in an amount of 0.0005% to 5%, more preferably 0.001% to 2.5%, more particularly 0.01% to 1.5%, by weight, based on the total weight of the monomers used for the polymerization (including the crosslinker).

One specific embodiment are polymer dispersions (PD) which comprise no copolymerized crosslinker.

The free-radical polymerization of the monomer mixture M) may take place in the presence of at least one regulator. Regulators are used preferably in an amount of 0.0005% to 5%, more preferably of 0.001% to 2.5%, and more particularly of 0.01% to 1.5% by weight, based on the total weight of the monomers used for the polymerization.

Regulators (polymerization regulators) is a general term for compounds having high transfer constants. Regulators accelerate chain transfer reactions to bring about reduction in the degree of polymerization of the resultant polymers without affecting the overall reaction rate. Regulators may be subdivided into monofunctional, difunctional or polyfunctional regulators, depending on the number of functional groups in the molecule that are able to lead to one or more chain transfer reactions. Suitable regulators are described comprehensively, for example, by K. C. Berger and G. Brandrup in J. Brandrup, E. H. Immergut, Polymer Handbook, $3^{rd}$ ed., John Wiley & Sons, New York, 1989, p. II/81-II/141.

Examples of suitable regulators include aldehydes such as formaldehyde, acetaldehyde, propionaldehyde, n-butyraldehyde, and isobutyraldehyde.

Other regulators which can also be used are as follows: formic acid, its salts or esters, such as ammonium formate, 2,5-diphenyl-1-hexene, hydroxylammonium sulfate, and hydroxylammonium phosphate.

Further suitable regulators are halogen compounds, examples being alkyl halides such as tetrachloromethane, chloroform, bromotrichloromethane, bromoform, allyl bromide, and benzyl compounds such as benzyl chloride or benzyl bromide.

Further suitable regulators are allyl compounds, such as allyl alcohol, functionalized allyl ethers, such as allyl ethoxylates, alkyl allyl ethers or glycerol monoallyl ether.

As regulators it is preferred to use compounds comprising sulfur in bound form.

Examples of compounds of this kind are inorganic hydrogen sulfites, disulfites, and dithionites or organic sulfides, disulfides, polysulfides, sulfoxides, and sulfones. They include di-n-butyl sulfide, di-n-octyl sulfide, diphenyl sulfide, thiodiglycol, ethylthio-ethanol, diisopropyl disulfide, di-n-butyl disulfide, di-n-hexyl disulfide, diacetyl disulfide, diethanol sulfide, di-tert-butyl trisulfide, dimethyl sulfoxide, dialkyl sulfide, dialkyl disulfide and/or diaryl sulfide.

Suitable polymerization regulators further include thiols (compounds which comprise sulfur in the form of SH groups, also referred to as mercaptans). Preferred regulators are mono-, di-, and polyfunctional mercaptans, mercapto alcohols and/or mercapto carboxylic acids. Examples of these compounds are allyl thioglycolates, ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea, and alkyl mercaptans such as n-butyl mercaptan, n-hexyl mercaptan or n-dodecyl mercaptan.

Examples of difunctional regulators, comprising two sulfur atoms in bound form, are difunctional thiols such as, for example, dimercaptopropanesulfonic acid (sodium salt), dimercaptosuccinic acid, dimercapto-1-propanol, dimercaptoethane, dimercaptopropane, dimercaptobutane, dimercaptopentane, dimercaptohexane, ethylene glycol bisthioglycolates and butanediol bisthioglycolate. Examples of polyfunctional regulators are compounds which comprise more than two sulfur atoms in bound form. Examples thereof are trifunctional and tetrafunctional mercaptans.

All of the stated regulators may be used individually or in combination with one another. One specific embodiment relates to polymer dispersions PD which are prepared by free-radical emulsion polymerization without addition of a regulator.

To prepare the polymers it is possible to polymerize the monomers with the aid of initiators that form free radicals.

As initiators for the free-radical polymerization it is possible to employ the peroxo and/or azo compounds customary for the purpose, examples being alkali metal or ammonium peroxidisulfates, diacetyl peroxide, dibenzoyl peroxide, succinyl peroxide, di-tert-butyl peroxide, tert-butyl perbenzoate, tert-butyl perpivalate, tert-butyl peroxy-2-ethylhexanoate, tert-butyl permaleate, cumene hydroperoxide, diisopropyl peroxidicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, 2,2'-azobis (2-amidinopropane) dihydrochloride or 2-2'-azobis(2-methylbutyronitrile). Mixtures of these initiators are suitable as well.

Among the initiators that can be used are reduction/oxidation (i.e., redox) initiator systems. The redox initiator systems are composed of at least one, usually inorganic, reducing agent and one organic or inorganic oxidizing agent. The oxidizing component comprises, for example, the initiators already specified above for the emulsion polymerization. In the case of the reducing component the compound in question comprises, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to occur in a plurality of valence states. Typical redox initiator systems are, for example, ascorbic acid/iron(II) sulfate/sodium peroxodisulfate, tert-butyl hydroperoxide/sodium disulfite, tert-butyl hydroperoxide/Na hydroxymethanesulfinic acid. The individual components, the reducing component for example, may also be mixtures—for example, a mixture of sodium salt of hydroxymethanesulfinic acid with sodium disulfite.

The amount of initiators is generally 0.1% to 10% by weight, preferably 0.1% to 5% by weight, based on all of the monomers to be polymerized. It is also possible to use two or more different initiators in the emulsion polymerization.

The preparation of the polymer dispersion (PD) takes place typically in the presence of at least one surface-active compound. A comprehensive description of suitable protective colloids is found in Houben-Weyl, Methoden der organischen Chemie, volume XIV/1, Makromolekulare Stoffe, Georg Thieme Verlag, Stuttgart, 1961, pp. 411 to 420. Suitable emulsifiers are also found in Houben-Weyl, Methoden der organischen Chemie, volume 14/1, Makromolekulare Stoffe, Georg Thieme Verlag, Stuttgart, 1961, pages 192 to 208.

Suitable emulsifiers are anionic, cationic, and nonionic emulsifiers. As surface-active substances it is preferred to use emulsifiers, whose relative molecular weights are typically below those of protective colloids.

Useful nonionic emulsifiers are araliphatic or aliphatic nonionic emulsifiers, examples being ethoxylated mono-, di-, and trialkylphenols (EO degree: 3 to 50, alkyl radical: $C_4$-$C_{10}$), ethoxylates of long-chain alcohols (EO degree: 3 to 100, alkyl radical: $C_8$-$C_{36}$) and also polyethylene oxide/polypropylene oxide homopolymers and copolymers. These may comprise the alkylene oxide units copolymerized in random distribution or in the form of blocks. Highly suitable, for example, are EO/PO block copolymers. Preference is given to using ethoxylates of long-chain alkanols (alkyl radical $C_1$-$C_{30}$, average degree of ethoxylation 5 to 100) and, of these, particular preference to those having a linear $C_{12}$-$C_{20}$ alkyl radical and an average degree of ethoxylation of 10 to 50, and also ethoxylated monoalkylphenols.

Examples of suitable anionic emulsifiers are alkali metal salts and ammonium salts of alkyl sulfates (alkyl radical: $C_8$-$C_{22}$), of sulfuric monoesters or phosphoric monoesters with ethoxylated alkanols (EC) degree: 2 to 50, alkyl radical: $C_{12}$-$C_{18}$) and with ethoxylated alkylphenols (EO degree: 3 to 50, alkyl radical: $C_4$-$C_9$), of alkylsulfonic acids (alkyl radical: $C_{12}$-$C_{18}$), and of alkylarylsulfonic acids (alkyl radical: $C_9$-$C_{18}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192-208). Likewise suitable as anionic emulsifiers are bis(phenylsulfonic acid) ethers and/or their alkali metal or ammonium salts which carry a $C_4$-$C_{24}$ alkyl group on one or both aromatic rings. These compounds are general knowledge, from U.S. Pat. No. 4,269,749, for example, and are available commercially, in the form for example of Dowfax® 2A1 (Dow Chemical Company).

Further emulsifiers are the esters—that is, the monoesters and diesters—of phosphoric acid with $C_8$-$C_{30}$ alkanols which may have been alkoxylated up to 20 times, especially the monoesters. Frequently the monoesters and the diesters are provided as a mixture alongside one another.

Other suitable emulsifiers are the diesters of phosphoric acid which have been esterified once with a $C_8$-$C_{30}$ alkanol, which may have been alkoxylated up to 20 times, and also once with a different $C_1$-$C_{30}$ alkanol, preferably with a $C_1$-$C_7$ alkanol.

Preferred emulsifiers are compounds of the general formula $C_sH_{2s+1}O(CH_2CH_2O)_t$—P(=O)(OH)$_2$, in which s is 6 to 30 and t is 0 to 20.

Preferred emulsifiers are, for example
Maphos 24 T ($C_{10}H_{21}O(CH_2CH_2O)_4$—P(=O)(OH)$_2$) and Maphos 10 T (2-ethylhexyl phosphate), both from BASF BTC.

Other suitable emulsifiers are the Lutensit® products from BASF SE, such as Lutensit® A-EP (fatty alcohol alkoxylate, phosphoric ester) or else Lutensit® HC9812 (fatty alcohol ethoxylate, phosphoric ester, polymer), for example.

The polymer dispersions (PD) of the invention comprise in general up to 20%, preferably up to 10%, more preferably up to 5%, by weight of at least one emulsifier, based on the total weight of the monomers used in the emulsion polymerization. The polymer dispersions (PD) of the invention generally comprise at least 0.05% by weight, preferably at least 0.1% by weight, of at least one emulsifier, based on the total weight of the monomers used for the emulsion polymerization.

Suitable cationic emulsifiers are preferably quaternary ammonium halides, e.g., trimethylcetylammonium chloride, methyltrioctylammonium chloride, benzyl-triethylammonium chloride or quaternary compounds of N—$C_6$-$C_{20}$ alkylpyridines, -morpholines or -imidazoles, e.g., N-laurylpyridinium chloride.

The amount of emulsifier is generally about 0.01% to 10% by weight, preferably 0.1% to 5% by weight, based on the amount of monomers to be polymerized.

The polymer dispersions (PD) may additionally be admixed with typical auxiliaries and additives. These include, for example, pH modifiers, reductants and bleaches, such as the alkali metal salts of hydroxymethanesulfinic acid (e.g., Rongalit® C from BASF SE), complexing agents, deodorants, flavors, odorants, and viscosity modifiers, such as alcohols, e.g., glycerol, methanol, ethanol, tert-butanol, glycol, etc. These auxiliaries and additives may be added to the polymer dispersions in the initial charge, in one of the feeds, or after the end of the polymerization.

The polymerization takes place in general at temperatures in a range from 0 to 150° C., preferably 20 to 100° C., more preferably 30 to 95° C. The polymerization takes place preferably under atmospheric pressure, although a polymerization under elevated pressure is also possible, such as under the autogenous pressure of the components used for the polymerization. In one suitable version the polymerization takes place in the presence of at least one inert gas, such as nitrogen or argon, for example.

The polymerization medium may be composed either of water alone or of mixtures of water and water-miscible liquids such as methanol. Preferably just water is used. The emulsion polymerization may be carried out either as a batch operation or in the form of a feed process, including staged or gradient procedures. Preference is given to the feed process, in which a portion of the polymerization batch or else a polymer seed is introduced as an initial charge and heated to the polymerization temperature, polymerization is commenced, and then the remainder of the polymerization batch, typically by way of two or more spatially separate feeds, of which one or more comprise the monomers in pure form or in emulsified form, is supplied to the polymerization zone continuously, in stages or under the superimposition of a concentration gradient, with the polymerization being maintained.

The manner in which the initiator is added to the polymerization vessel in the course of the free-radical aqueous emulsion polymerization is known to a person of ordinary skill in the art. It can be included in its entirety in the initial charge to the polymerization vessel, or else employed in stages or continuously in accordance with the rate of its consumption in the course of the free-radical aqueous emulsion polymerization. In each case this will depend, in a manner known per se to a person of ordinary skill in the art, both on the chemical nature of the initiator system and on the polymerization temperature. Preferably a portion is included in the initial charge and the remainder is supplied to the polymerization zone in accordance with the rate of its consumption.

The dispersions that are formed in the polymerization may be subjected, following the polymerizing operation, to a physical or chemical aftertreatment (chemical deodorizing). Examples of such techniques are the known techniques for residual monomer reduction, such as aftertreatment by addition of polymerization initiators or mixtures of two or more polymerization initiators at suitable temperatures; aftertreatment of the polymer solution by means of water vapor or ammonia vapor; or stripping with inert gas; or treatment of the reaction mixture with oxidizing or reducing reagents; adsorption techniques such as the adsorption of impurities on selected media such as activated carbon, for example; or an ultrafiltration, for example.

The aqueous acrylate-alkyd polymer dispersion (PD) typically has a solids content of 20% to 70% by weight, preferably 40% to 65% by weight, based on the polymer dispersion, including water-soluble alkyd resin or aqueous alkyd resin emulsion or polyurethane-alkyd resin emulsion employed.

In one specific embodiment the solids content is 30-55% by weight, preferably 35% to 50% by weight, more preferably 40% to 50% by weight, based on the aqueous acrylate-alkyd polymer dispersion including water-soluble alkyd resin employed or aqueous alkyd resin emulsion or polyurethane-alkyd resin emulsion employed.

The theoretical glass transition temperature, $T_g$, of the acrylate portion of the acrylate-alkyd polymer dispersion is preferably less than 50° C. but greater than 20° C., more preferably less than 40° C. but greater than 20° C., more particularly less than 30° C. but greater than 20° C.

The glass transition temperature $T_g$ here is the midpoint temperature as determined by differential thermal analysis (DSC) in accordance with ASTM D 3418-82 (cf. Ullmann's Encyclopedia of Industrial Chemistry, 5th Edition, Volume A 21, VCH Weinheim 1992, p. 169, and also Zosel, Farbe and Lack 82 (1976), pp. 125-134; see also DIN 53765).

According to Fox (see Ullmanns Enzyklopädie der technischen Chemie, 4th edition, volume 19, Weinheim (1980), pp. 17, 18), it is possible to estimate the glass transition temperature $T_g$. The glass transition temperature of copolymers with low levels of crosslinking, or none, is given at high molar masses, in good approximation, by:

$$\frac{1}{Tg} = \frac{X^1}{Tg^1} + \frac{X^2}{Tg^2} + \ldots \frac{X^n}{Tg^n}$$

where $X^1, X^2, \ldots, X^n$, are the mass fractions $1, 2, \ldots, n$ and $T_g^1, T_g^2, \ldots, T_g^n$ are the glass transition temperatures of the polymers constructed in each case only from one of the monomers $1, 2, \ldots, n$, in degrees Kelvin. The latter are known, for example, from Ullmann's Encyclopedia of Industrial Chemistry, VCH, 5th edition, Weinheim, Vol. A 21 (1992) p. 169, or from J. Brandrup, E. H. Immergut, Polymer Handbook $3^{rd}$ edition, J. Wiley, New York 1989.

The aqueous polymer dispersion (PD) obtained can be used as it is or mixed with further, generally film-forming, polymers, as a binder composition in aqueous coating compositions, such as paint or varnish mixtures.

The invention further provides a coating composition in the form of an aqueous composition comprising at least one dispersion (PD), as defined above, which comprises a water-soluble alkyd resin or an aqueous alkyd resin emulsion or polyurethane-alkyd resin emulsion. The water-soluble alkyd resins or aqueous alkyd resin emulsions or polyurethane-alkyd resin emulsions are reacted with the acrylate, as defined above, following the free-radical acrylate polymerization or the chemical aftertreatment (deodorizing) downstream of the free-radical acrylate polymerization.

The binder compositions of the invention are employed preferably in aqueous coating materials. These coating materials take the form, for example, of an unpigmented system (clear varnish) or of a pigmented system. The fraction of the pigments can be described by the pigment volume concentration (PVC). The PVC describes the ratio of the volume of pigments ($V_P$) and fillers ($V_F$) to the total volume, composed of the volumes of binder ($V_B$), pigments, and fillers of a dried coating film, in percent: $PVC=(V_P+V_F)\times100/(V_P+V_F+V_B)$. Coating materials can be divided on the basis of the PVC, for example, as follows:

| | |
|---|---|
| highly filled interior paint, wash resistant, white/matt | about 85 |
| interior paint, scrub resistant, white/matt | about 80 |
| semigloss paint, silk-matt | about 35 |
| semigloss paint, silk-gloss | about 25 |
| high-gloss paint | about 15-25 |
| exterior masonry paint, white | about 45-55 |
| clear varnish | 0 |

The invention provides further a coating composition in the form of an aqueous composition, comprising:
  at least one dispersion (PD), as defined above,
  if desired, at least one inorganic filler and/or at least one inorganic pigment,
  if desired, at least one customary auxiliary, and
  water.

The fraction of (PD) as a proportion of the above coating composition is based on solids, i.e., on the acrylate-alkyd polymer, without water.

The coating compositions of the invention, in the form of an aqueous composition, are employed preferably as coating materials. One embodiment relates to coating materials in the form of a clear varnish. Another embodiment comprises coating materials in the form of an emulsion paint. The pigmented coating compositions of the invention take the form preferably of an aqueous silk-gloss or high-gloss paint.

Elucidated in the text below is the composition of a typical emulsion paint. Emulsion paints comprise generally 30% to 75% and preferably 40% to 65% by weight of nonvolatile constituents. By these are meant all constituents of the preparation which are not water, but at least the total amount of binder, filler, pigment, low-volatility solvents (boiling point above 250° C.), plasticizers for example, and polymeric auxiliaries. This FIGURE is accounted for to the extent of about
a) 3% to 90%, more particularly 10% to 60%, by weight, by the finely divided polymer dispersion (PD), as defined above,
b) 0% to 85%, preferably 5% to 60%, more particularly 10% to 50%, by weight, by at least one inorganic pigment,
c) 0% to 85%, more particularly 5% to 60%, by weight, by inorganic fillers, and
d) 0.1% to 40%, more particularly 0.5% to 20%, by weight, by typical auxiliaries, and water to 100% by weight.

With particular preference the polymer dispersions of the invention are suitable for producing high-gloss emulsion paints. These paints are characterized generally by a pigment volume concentration PVC in the range from 12% to 30%. However, for masonry paints as well, with a PVC in the range from 30 to 65, or interior paints, with a PVC in the range from 65 to 80, the polymer dispersions of the invention are particularly suitable.

The pigments include inorganic white pigments such as titanium dioxide, preferably in the rutile form, barium sulfate, zinc oxide, zinc sulfide, basic lead carbonate, antimony trioxide, lithopones (zinc sulfide+barium sulfate), or colored pigments, for example iron oxides, carbon black, graphite, zinc yellow, zinc green, ultramarine, manganese black, antimony black, manganese violet, Paris blue or Schweinfurt green. Besides the inorganic pigments the emulsion paints of the invention may also comprise organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone, and metal complex pigments. Also suitable are synthetic white pigments with air inclusions to increase the light scattering, such as the Rhopaque® dispersions.

Suitable fillers are, for example, aluminosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicon dioxide, etc. Finely divided fillers are of course preferred in coating materials. The fillers can be used as individual components. In actual practice, however, filler mixtures have proven particularly appropriate, examples being calcium carbonate/kaolin and calcium carbonate/talc. Glossy coating materials generally include only small amounts of very finely divided fillers, or contain no fillers.

Finely divided fillers may also be used to increase the hiding power and/or to save on the use of white pigments. For the adjustment of the hiding power of the hue, and of the depth of color, it is preferred to use blends of color pigments and fillers.

The typical auxiliaries, in addition to the emulsifiers used in the polymerization, include wetting agents or dispersants, such as amino alcohols, e.g., 2-amino-2-methylpropan-1-ol, or block copolymers having hydrophobic and hydrophilic blocks, such as poly-EO blocks, for example, sodium, potassium or ammonium polyphosphates, alkali metal salts and ammonium salts of acrylic acid copolymers or maleic anhydride copolymers, polyphosphonates, such as sodium 1-hydroxyethane-1,1-diphosphonate, and salts of naphthalenesulfonic acids, more particularly their sodium salts.

Further suitable auxiliaries are flow control agents, matting agents, block resistance and scratch resistance enhancer additives, defoamers, biocides, and thickeners. Suitable thickeners are, for example, associative thickeners, such as polyurethane thickeners and hydrophobically modified acrylate thickeners. The amount of the thickener is preferably less than 1% by weight, more preferably less than 0.6% by weight, of thickener, based on the solids content of the coating material.

The coating materials of the invention are produced in a known way by blending the components in mixing apparatus customary for the purpose. It has been found appropriate to prepare an aqueous paste or dispersion from the pigments, water, and, if appropriate, the auxiliaries, and only then to mix the polymeric binder, i.e., in general, the aqueous dispersion of the polymer, with the pigment paste or pigment dispersion.

The coating materials of the invention comprise generally 30% to 75% and preferably 40% to 65% by weight of nonvolatile constituents. By these are meant all constituents of the preparation which are not water, but at least the total amount of binder, pigment, and auxiliary. The volatile constituents are primarily water.

The coating material of the invention may be applied to substrates in a typical way, as for example by spreading, spraying, dipping, rolling, knife coating, etc.

The coating materials of the invention are used in the segment of decorative coatings for glossy and high-gloss surfaces. Substrates may be wood, metal, plastic, paper or others.

The coating material finds application, for example, for building interiors, examples being interior walls, interior doors, paneling, banisters, furniture, or else in the exterior segment, for example, for the coating of balcony parapets, fences, windows, boarding, sheds and summerhouses, garden furniture, etc.

The coating materials of the invention feature ease of handling, good processing properties, and high hiding power. Their pollutant content is low. They have good performance properties, such as high water resistance, good wet adhesion, not least on alkyd paints, high blocking resistance, good recoatability, and good flow on application. The equipment used is easily cleaned with water.

The invention is elucidated in more detail with reference to the following, nonlimiting examples.

EXAMPLES

1. Preparation of Aqueous Paints

The individual components (for manufacturer list see Table 1) were metered in with stirring, using a toothed-disk stirrer, in the amount (parts by weight) and order as indicated in Table 2. Following addition of the titanium dioxide pigment, the speed was raised to 2000 rpm and dispersion continued until the pigment paste was smooth, i.e., free from lumps. It was then cooled, if necessary, to room temperature, and the remaining components were added at reduced speed.

TABLE 1

| Function | Name | Manufacturer |
| --- | --- | --- |
| Dispersant | Disperbyk ® 190 (high molecular mass block copolymer with pigment-active groups) | Byk-Chemie GmbH, Wesel |
| Defoamers | Byk ® 020 (polysiloxane) | Byk-Chemie GmbH, Wesel |
|  | Tego Airex ® 902W (silica-containing poly(ether-siloxane) copolymer | Tego Chemie, Essen |
| Titanium dioxide pigment | Kronos ® 2190 | Kronos Titan GmbH, Leverkusen |
| Thickeners | DSX 2000 and DSX 1514 (associative thickeners based on polyurethane) | Cognis Deutschland GmbH & Co. KG, Düsseldorf |

TABLE 2

Formulation of the aqueous coating compositions

| Component | Name | Amount [g] |
| --- | --- | --- |
| Water |  | 10.72 |
| Defoamer | Byk ® 020 | 0.96 |
| Dispersant | Disperbyk ® 190 | 4.7 |
| Thickener | DSX 2000/1514 (1:0.3) | 2.46 |
| Titanium dioxide pigment | Kronos ® 2190 | 47.16 |
| Paste |  | 66 |
| Water |  | 7.7 |
| Solvent | Propylene glycol | 4.36 |
| Defoamer | Tego Airex ® 902W | 0.04 |
| Binder |  | 121.9 |
| Total |  | 200.0 |

2. Testing of the Aqueous Paints

Coating Compositions

The gloss of the coating material is determined in accordance with DIN EN ISO 2813: the coating material is applied with a slot width of 240 µm to a glass plate and is dried at room temperature for 72 hours. The test element is inserted into a calibrated haze-gloss (Byk-Gardner, Geretsried) reflectometer and the reflectometer value at 20° and 60° incident beam angle, and also the haze (gloss haze), are read off. The reflectometer value found is a measure of the gloss (the higher the value, the higher the gloss).

Comparative Example 1

The following constituents were charged to a polymerization vessel equipped with metering apparatus and temperature regulation:
Initial charge: 116 g water
    19.2 g a polystyrene seed dispersion having a solids content of 33% and an average particle size of 30 nm
    1.5 g a 15% strength solution of sodium lauryl sulfate
and heated to 85° C. with stirring. Subsequently, with this temperature maintained, 10% of feed 3 was added, and stirring was carried out for 5 minutes. Thereafter, feeds 1 and 2 were metered in over 180 minutes and, in parallel therewith, the remainder of feed 3, in 195 minutes.
Feed 1: 79.5 g water
    51.2 g a 15% strength solution of sodium lauryl sulfate
    117 g n-butyl acrylate
    97.1 g methyl methacrylate
    65.5 g styrene
    13.5 g acetoacetoxyethyl methacrylate
Feed 2: 371 g a 42.5% strength aqueous solution of WorléeSol 61 E, neutralized beforehand with 25% strength aqueous ammonia solution
Feed 3: 72.2 g a 2.5% strength aqueous solution of sodium peroxodisulfate When feed 3 was ended, post-polymerization was carried out subsequently for 30 minutes, and neutralization took place with 0.51 g of a 25% strength aqueous solution of ammonia. Then 5.42 g of a 5% strength aqueous solution of hydrogen peroxide were added, and 2.3 g of a 10% aqueous solution of ascorbic acid (ASCS) were metered in over 60 minutes.

The dispersion was subsequently cooled and filtered through a 125 μm filter. This gave 1.04 kg of a 45% dispersion.

Inventive Example 1

The following constituents were charged to a polymerization vessel equipped with metering apparatus and temperature regulation:
Initial charge: 116 g water
    19.2 g a polystyrene seed dispersion having a solids content of 33% and an average particle size of 30 nm
    1.5 g a 15% strength solution of sodium lauryl sulfate
and heated to 85° C. with stirring. Subsequently, with this temperature maintained, 10% of feed 3 was added, and stirring was carried out for 5 minutes. Thereafter, feed 1 was metered in over 180 minutes and, in parallel therewith, the remainder of feed 3, in 195 minutes.
Feed 1: 79.5 g water
    51.2 g a 15% strength solution of sodium lauryl sulfate
    117 g n-butyl acrylate
    97.1 g methyl methacrylate
    65.5 g styrene
    13.5 g acetoacetoxyethyl methacrylate
Feed 2: 393 g a 42.5% strength aqueous solution of WorléeSol 61 E, neutralized beforehand with 25% strength aqueous ammonia solution
Feed 3: 72.2 g a 2.5% strength aqueous solution of sodium peroxodisulfate When feed 3 was ended, 22.6 g of rinsing water were metered in, followed by post-polymerization for 30 minutes. Feed 2 was metered in over 1 hour, and then neutralization took place with 1.81 g of a 25% strength aqueous solution of ammonia. The dispersion was subsequently cooled and filtered through a 125 μm filter. This gave 1.04 kg of a 45% dispersion.

Inventive Example 2

Like inventive example 1, but metering of feed 2 over 2 hours.

Inventive Example 3

Like inventive example 1, but metering of feed 2 over 3 hours.

Inventive Example 4

The following constituents were charged to a polymerization vessel equipped with metering apparatus and temperature regulation:
Initial charge: 116 g water
    19.2 g a polystyrene seed dispersion having a solids content of 33% and an average particle size of 30 nm
    1.5 g a 15% strength solution of sodium lauryl sulfate
and heated to 85° C. with stirring. Subsequently, with this temperature maintained, 10% of feed 3 was added, and stirring was carried out for 5 minutes. Thereafter, feed 1 was metered in over 180 minutes and, in parallel therewith, the remainder of feed 3, in 195 minutes.
Feed 1: 79.5 g water
    51.2 g a 15% strength solution of sodium lauryl sulfate
    117 g n-butyl acrylate
    97.1 g methyl methacrylate
    65.5 g styrene
    13.5 g acetoacetoxyethyl methacrylate
Feed 2: 393 g a 42.5% strength aqueous solution of WorléeSol 61 E, neutralized beforehand with 25% strength aqueous ammonia solution
Feed 3: 72.2 g a 2.5% strength aqueous solution of sodium peroxodisulfate When feed 3 was ended, 22.6 g of rinsing water were metered in, followed by post-polymerization for 30 minutes. Thereafter, 5.42 g of a 5% strength aqueous solution of hydrogen peroxide were added, and 2.3 g of a 10% aqueous solution of ascorbic acid (ASCS) were metered in over 1 hour. Feed 2 was metered in over 1 hour, and then neutralization took place with 1.81 g of a 25% strength aqueous solution of ammonia. The dispersion was subsequently cooled and filtered through a 125 μm filter. This gave 1.04 kg of a 45% dispersion.

Inventive Example 5

Like inventive example 4, but metering of feed 2 over 2 hours.

Inventive Example 6

Like inventive example 4, but metering of feed 2 over 3 hours.

Use of an aqueous polyurethane-modified alkyd emulsion

Comparative Example 2

The following constituents were charged to a polymerization vessel equipped with metering apparatus and temperature regulation:
Initial charge: 116 g water 19.2 g a polystyrene seed dispersion having a solids content of 33% and an average particle size of 30 nm
1.5 g a 15% strength solution of sodium lauryl sulfate
and heated to 85° C. with stirring. Subsequently, with this temperature maintained, 10% of feed 3 was added, and stirring was carried out for 5 minutes. Thereafter, feeds 1 and 2 were metered in over 180 minutes and, in parallel therewith, the remainder of feed 3, in 195 minutes.
Feed 1: 55.3 g water
    51.2 g a 15% strength solution of sodium lauryl sulfate
    117 g n-butyl acrylate
    97.1 g methyl methacrylate
    65.5 g styrene
    13.5 g acetoacetoxyethyl methacrylate
Feed 2: 395 g WorléeSol® E 150 W
Feed 3: 72.2 g a 2.5% strength aqueous solution of sodium peroxodisulfate When feed 3 was ended, post-polymerization was carried out subsequently for 30 minutes, and neutralization took place with 1.81 g of a 25% strength aqueous solution of ammonia. Then 5.42 g of a 5% strength aqueous solution of hydrogen peroxide were added, and 2.3 g of a 10% aqueous solution of ascorbic acid (ASCS) were metered in over 60 minutes. Neutralization was carried out with 0.9 g of a 25% strength aqueous ammonia solution.

The dispersion was subsequently cooled and filtered through a 125 μm filter. This gave 1.04 kg of a 45% dispersion.

Inventive Example 7

The following constituents were charged to a polymerization vessel equipped with metering apparatus and temperature regulation:
Initial charge: 116 g water
    19.2 g a polystyrene seed dispersion having a solids content of 33% and an average particle size of 30 nm
    1.5 g a 15% strength solution of sodium lauryl sulfate
and heated to 85° C. with stirring. Subsequently, with this temperature maintained, 10% of feed 3 was added, and stirring was carried out for 5 minutes. Thereafter, feed 1 was metered in over 180 minutes and, in parallel therewith, the remainder of feed 3, in 195 minutes.
Feed 1: 55.3 g water
    51.2 g a 15% strength solution of sodium lauryl sulfate
    117 g n-butyl acrylate
    97.1 g methyl methacrylate
    65.5 g styrene
    13.5 g acetoacetoxyethyl methacrylate
Feed 2: 395 g WorléeSol® E 150 W
Feed 3: 72.2 g a 2.5% strength aqueous solution of sodium peroxodisulfate When feed 3 was ended, 22.6 g of rinsing water were metered in, followed by post-polymerization for 30 minutes. Neutralization was carried out with 1.81 g of a 25% strength aqueous ammonia solution, and stirring for five minutes. Thereafter 5.42 g of a 5% strength aqueous solution of hydrogen peroxide were added, and 2.3 g of a 10% aqueous solution of ascorbic acid (ASCS) were metered in over 1 hour. Feed 2 was metered in over 1 hour, and then neutralization took place with 0.9 g of a 25% strength aqueous solution of ammonia.

The dispersion was subsequently cooled and filtered through a 125 μm filter. This gave 1.04 kg of a 45% dispersion.
Results

| Example | Total of residual monomers | Gloss 20° | Gloss 60° | Haze |
|---|---|---|---|---|
| Comparative example 1 | 8951 ppm | 79 | 91 | 38 |
| Inventive example 1 | 2530 ppm | 79 | 91 | 97 |
| Inventive example 2 | 1870 ppm | 78 | 90 | 55 |
| Inventive example 3 | 1630 ppm | 79 | 91 | 46 |
| Inventive example 4 | 1380 ppm | 85* | 92* | 0* |
| Inventive example 5 | 730 ppm | 77 | 91 | 57 |
| Inventive example 6 | 750 ppm | 79 | 91 | 55 |
| Comparative example 2 | 7560 ppm | 52 | 81 | 135 |
| Inventive example 7 | 1080 ppm | 62 | 86 | 109 |

*Drying 1 d RT then 14 d at 50° C.

Total of the residual monomers refers to the acrylate-alkyd hybrids; gloss and haze values relate to the paints prepared as per the formulation of Table 2

The invention claimed is:
1. A process for preparing an aqueous acrylate-alkyd polymer dispersion (PD) by free-radical emulsion polymerization of
(a) at least one α,β-ethylenically unsaturated monomer (M),
(b) and at least one further monomer (M1) selected from the group consisting of esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, and mixtures thereof, to give a polymer (P),
(c) optionally, subsequent chemical deodorization and
(d) addition of at least one water-soluble alkyd resin having a weight-average molecular weight of between 5000 and 40,000 Da, or of at least one aqueous alkyd emulsion or polyurethane-alkyd emulsion,
which comprises adding the alkyd resin or the alkyd emulsion or polyurethane-alkyd emulsion, the temperature at addition being 60 to 99° C., either subsequent to the polymerization of M and M1, with an afterstir time of 0-2 h or subsequent to the chemical deodorization when carried out, with an afterstir time of 0-2 h.

2. The process according to claim 1, wherein the addition of the alkyd resin or of the alkyd emulsion or polyurethane-alkyd emulsion takes place subsequent to the polymerization of M and M1, with an afterstir time of 0-2 h.

3. The process according to claim 1, wherein the chemical deodorization is carried out, and the addition of the alkyd resin or of the alkyd emulsion or polyurethane-alkyd emulsion takes place subsequent to the chemical deodorization, with an afterstir time of 0-2 h.

4. The process according to any of claims 1 to 3, wherein the temperature on addition of the alkyd resin or of the alkyd emulsion or polyurethane-alkyd emulsion is 70 to 95° C.

5. The process according to any of claims 1 to 3, wherein the temperature on addition of the alkyd resin or of the alkyd emulsion or polyurethane-alkyd emulsion is 80 to 90° C.

6. The process according to any of claims 1 to 3, wherein alkyd used is an aqueous alkyd emulsion or polyurethane-alkyd emulsion.

7. The process according to any of claims 1 to 3, wherein the monomers M1 are selected from combinations from the following group:
    n-butyl acrylate, methyl methacrylate;
    n-butyl acrylate, methyl methacrylate, styrene;
    n-butyl acrylate, styrene, butyl (meth)acrylate;
    n-butyl acrylate, ethylhexyl acrylate, styrene;
    n-butyl acrylate, styrene; or n-butyl acrylate, n-butyl (meth)acrylate, methyl methacrylate.

8. The process according to claim 7, wherein monomer M2 is polymerized in combination with the monomers M1 and said monomer M2 is acrylic acid, methacrylic acid, acrylamide, methacrylamide, acetoacetoxyethyl methacrylate, 2-ureido (meth)acrylate or a methoxypolyethylene glycol monomethacrylate or mixtures thereof.

9. The process according to any of claims 1 to 3, wherein the aqueous alkyd resin has an acid number of 20-80 mg KOH/g and a weight-average molecular weight of >5000 and <40,000 Da and an oil content of 25-55%.

10. The process according to any of claims 1 to 3, wherein the aqueous alkyd resin emulsion has an acid number of 20-60 mg KOH/g and an oil content of 25-55%.

11. The process according to any of claims 1 to 3, wherein the aqueous acrylate-alkyd polymer dispersion (PD) comprises up to 20% by weight of at least one emulsifier, based on the total weight of the monomers used for the emulsion polymerization.

12. The process according to any of claims 1 to 3, wherein the glass transition temperature, $T_g$, of the acrylate portion of the acrylate-alkyd polymer dispersion (PD) is less than 50° C. but greater than 20° C.

* * * * *